US008456703B2

(12) United States Patent
Hayakawa

(10) Patent No.: US 8,456,703 B2
(45) Date of Patent: Jun. 4, 2013

(54) INFORMATION PROCESSING APPARATUS FOR PRINTING PRINT JOB INFORMATION

(75) Inventor: Takeshi Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 12/786,185

(22) Filed: May 24, 2010

(65) Prior Publication Data

US 2010/0302560 A1 Dec. 2, 2010

(30) Foreign Application Priority Data

May 26, 2009 (JP) .................................. 2009-126383

(51) Int. Cl.
*G06F 15/00* (2006.01)
(52) U.S. Cl.
USPC .............. 358/1.9; 358/1.6; 358/1.18; 399/84; 399/365; 399/382; 400/76
(58) Field of Classification Search
None
See application file for complete search history.

(56) References Cited

U.S. PATENT DOCUMENTS

| 6,373,588 | B1 * | 4/2002 | Fischer et al. | 358/1.16 |
| 2005/0060650 | A1 * | 3/2005 | Ryan et al. | 715/526 |
| 2006/0045596 | A1 * | 3/2006 | Tischler | 400/76 |
| 2006/0133845 | A1 * | 6/2006 | Savitzky et al. | 399/84 |
| 2007/0147855 | A1 * | 6/2007 | Shimada | 399/21 |
| 2007/0213870 | A1 * | 9/2007 | Roberts et al. | 700/219 |
| 2008/0014002 | A1 * | 1/2008 | Edamatsu | 400/76 |
| 2008/0172302 | A1 * | 7/2008 | Knodt | 705/26 |

FOREIGN PATENT DOCUMENTS

JP 2008-33659 2/2008

* cited by examiner

*Primary Examiner* — Benjamin O Dulaney
(74) *Attorney, Agent, or Firm* — Canon USA Inc IP Division

(57) ABSTRACT

There is provided an information processing apparatus wherein if paper used to print a first page of a first print job is not tab paper, the paper of a size equal to the size of the paper used to print the first page is used for a job information sheet and, if the paper used to print the first page of the first print job is tab paper, the paper of a type different from the tab paper of the size determined based on the size of the tab paper used to print the first page is used for the job information sheet.

10 Claims, 22 Drawing Sheets

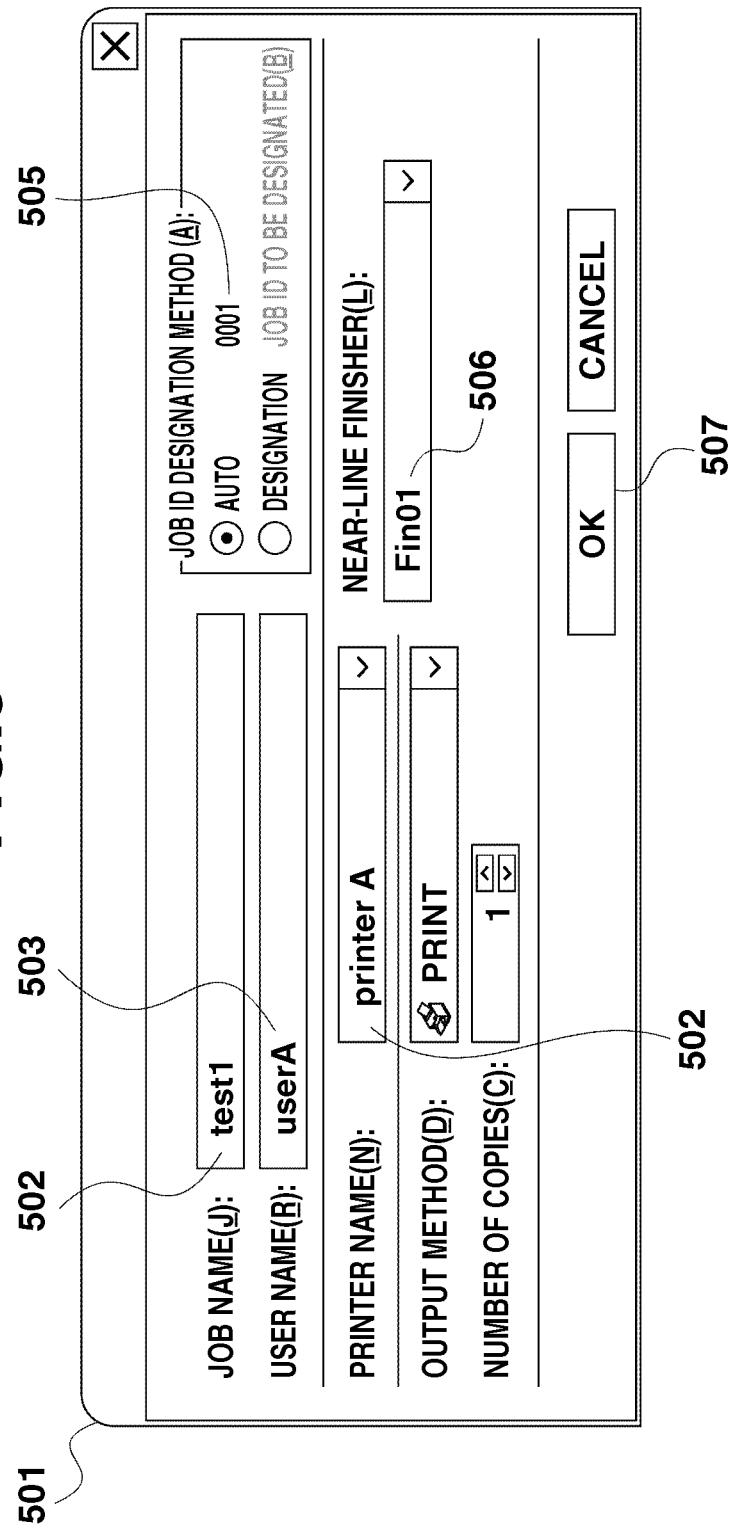

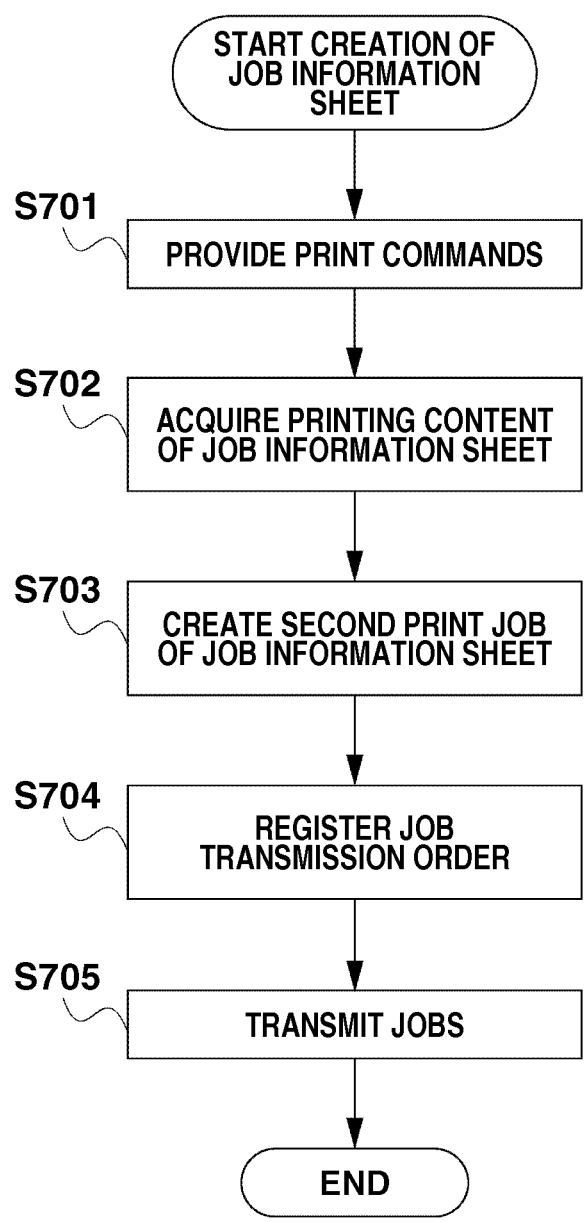

FIG.16A
FIG.16B
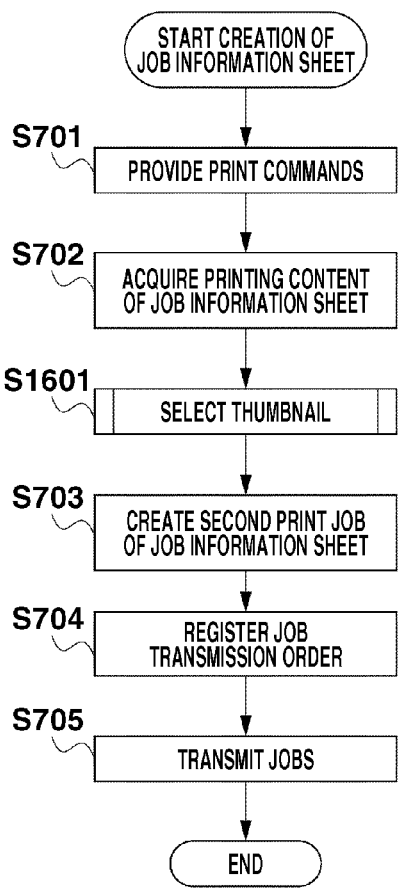
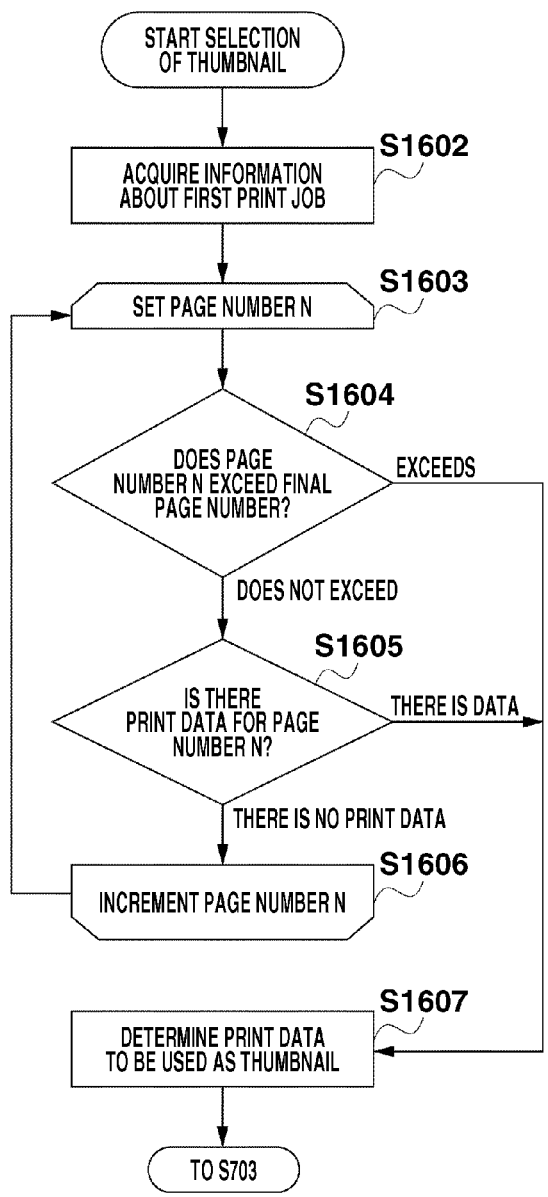

PLAIN PAPER

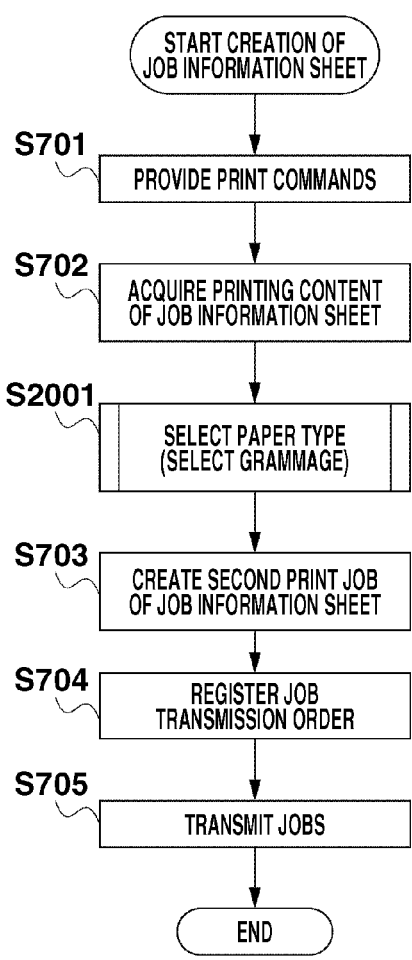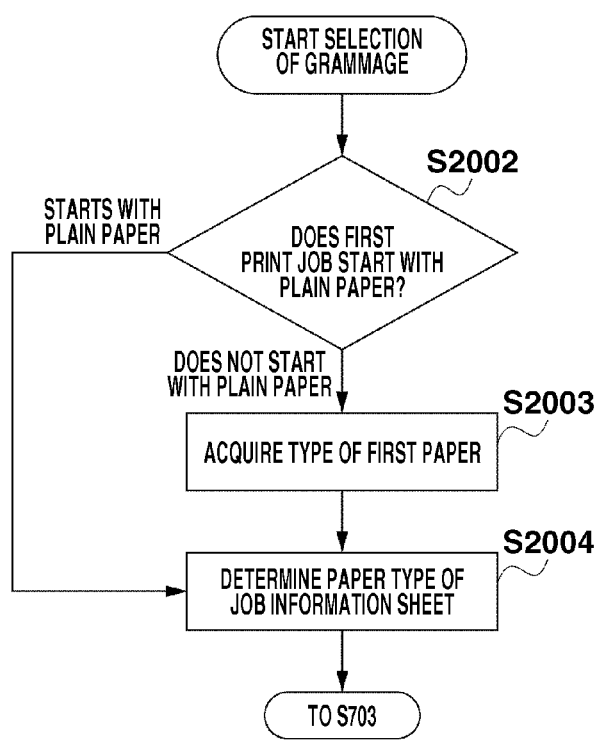
FIG.20A
FIG.20B

THICK PAPER

INFORMATION PROCESSING APPARATUS FOR PRINTING PRINT JOB INFORMATION

BACKGROUND OF THE INVENTION

1. Field of the Invention

The present invention relates to print settings for creating a job information sheet by a bookbinding application in printing using a near-line finisher of the bookbinding application.

2. Description of the Related Art

There has been a Print On Demand (POD) market in which an order of a printed product (such as magazines, newspaper, catalogs, and advertisements) is received from a customer and a printed product is generated from electronic data using a printing apparatus such as a digital copying machine. As to the printed products in the POD market, output products on which processing such as bookbinding, cutting-out, and folding are performed are frequently demanded. To generate such a complicated output product, a finishing device that processes a printed product output from a printer is used. When a printed product is fed, the finishing device performs processing such as folding, cutting-out, and bookbinding. Such a device dedicated to the finishing process is termed an offline finisher in the POD market. A device dedicated to the finishing process, which can communicate with a printer or a personal computer via a network is termed a near-line finisher.

When creating an output product using a near-line finisher, it is important to correctly provide instructions for post-processing to be performed on printed paper. A printed product output from a printer is set to the near-line finisher by an operator (person). Here, to avoid a problem of erroneously setting a printed product or a problem of a setting error in the post-processing, a technique to output paper (job information sheet) separately from the printed product on which the post-processing is performed is discussed by Japanese Patent Application Laid-Open No. 2008-33659. On the output paper, information to be set to the near-line finisher is printed.

The above problems can be avoided by a job information sheet, which is output by a printer together with a printed product in the set.

However, there is a possibility that a printed product based on an order from a customer is affected by printing of a job information sheet, so that the printed product desired by the customer may not be output.

While an order from a customer normally contains designation of the final form of an output product and paper type, a job information sheet is a sheet to facilitate a print job and is not contained in the order from the customer. Thus, print settings for a job information sheet are not designated by the order.

In order to reliably print a job information sheet, the paper type designated by an order from a customer is used. The paper designated by the order from the customer is naturally set to an image forming apparatus and thus, a job information sheet can also be reliably printed by using the same type of paper as the designated paper type.

However, for example, when tab paper is used for a printed product set to the near-line finisher, the tab paper will be used for a job information sheet if the job information sheet is printed by using the same paper cassette as that of the printed product set to the near-line finisher.

As a result, the tab paper that should have been used for a printed product set to the near-line finisher is used for a job information sheet, which causes a shift of the tab paper, leading to a possibility that a printed product desired by the customer may not be output (FIGS. 9 and 10).

The tab paper is special paper having a printing area called an ear at an edge of the paper. In a case of A4-size tab paper, its size becomes larger than the A4 size by a portion of the ear. However, the paper size of tab paper when handled by an application or an image forming apparatus indicates the corresponding paper size (that is, A4).

Moreover, to prevent paper mix-up or a setting error, an image of the first page of a printed product set to the near-line finisher may be printed in the "job information sheet". In this case, if an interleaf is inserted to the head of a printed product for the near-line finisher, images to be printed on a job information sheet may not be present, so that there is a possibility that mix-up of the paper or the like may not be preventable.

SUMMARY OF THE INVENTION

According to an aspect of the present invention, an information processing apparatus includes a first generation unit that generates a first print job to print a printed product including text and a second generation unit that, if paper used to print a first page of the first print job is not tab paper, generates a second print job to print related information to identify post-processing performed by a post-processing apparatus on the printed product of the first print job, for the paper of a size equal to the size of the paper used to print the first page and, if the paper used to print the first page is the tab paper, generates the second print job to print the related information on the paper of a type different from the tab paper of the size determined based on the size of the tab paper used to print the first page.

According to the present invention, in printing a job information sheet for near-line finishing, special paper such as tab paper can be prevented from being fed while dependent on print data, so that print errors of the print data can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a print command UI of the bookbinding application.

FIG. 7 is a flow chart for creating a job information sheet.

FIGS. 16A and 16B are flow charts for creating the job information sheet adaptable to the second exemplary embodiment.

FIGS. 20A and 20B are flow charts for creating the job information sheet adaptable to the third exemplary embodiment.

DESCRIPTION OF THE EMBODIMENTS

Various exemplary embodiments, features, and aspects of the invention will be described in detail below with reference to the drawings.

According to the first exemplary embodiment of the present invention, a program code of software to realize a function described in the exemplary embodiment is stored in a storage medium. The first exemplary embodiment of the present invention includes a case where the function is achieved by reading a program code stored in a storage medium and executing the program code by a computer (or a central processing unit (CPU) or microprocessing unit (MPU)) in a system or an apparatus.

First, the technique on which the present invention is predicated will be described. An information processing apparatus of the present invention includes an electronic draft writer that converts data created by a general application into an electronic copy file and a bookbinding application that edits the electronic copy file.

Figure 1:
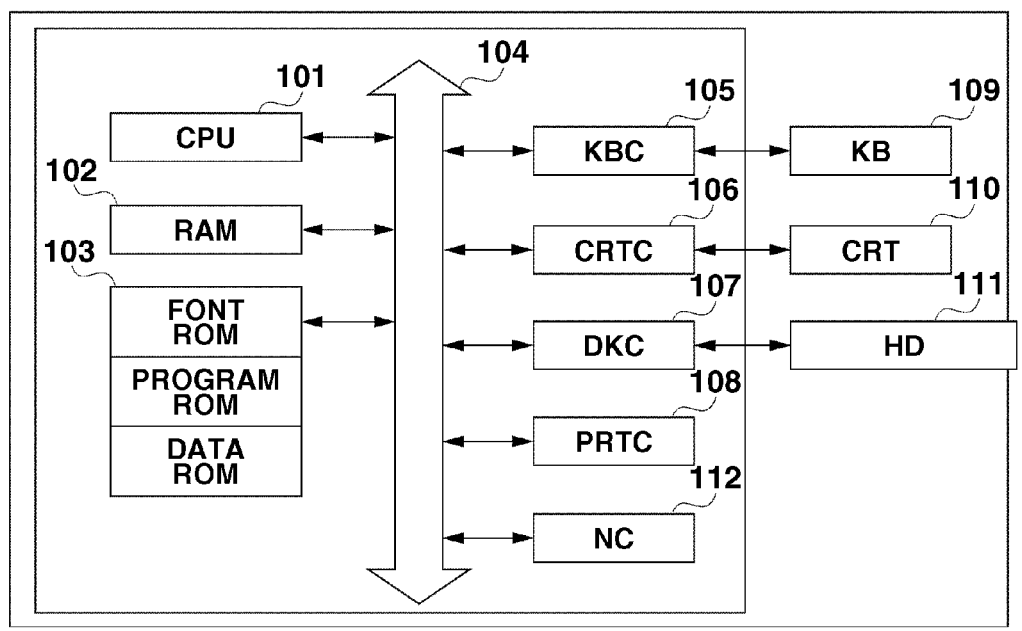
FIG. 1 is a block diagram illustrating a configuration of a personal computer.

FIG. 1 is a block diagram illustrating the configuration of an information processing apparatus adaptable to the present exemplary embodiment.

In FIG. 1, a CPU 101 executes a program such as an operating system (OS), a general application, and a bookbinding application loaded from a read-only memory (ROM) 103 or a hard disk 111 into a random access memory (RAM) 102 to realize a flow chart described below.

The RAM 102 functions as a main memory, a work area or the like of the CPU 101. A keyboard controller (KBC) 105 controls input from a keyboard 109 or a pointing device (not illustrated). A CRT controller (CRTC) 106 controls the display of a CRT display 110. A disk controller (DKC) 107 controls access to the hard disk (HD) 111 that stores a boot program, various applications, font data, user files, and compilation files, a floppy disk (FD), and the like. A PRTC 108 controls an exchange of signal with a connected printer 209. An NC 112 is connected to a network to perform communication control with other devices connected to the network.

Figure 2:
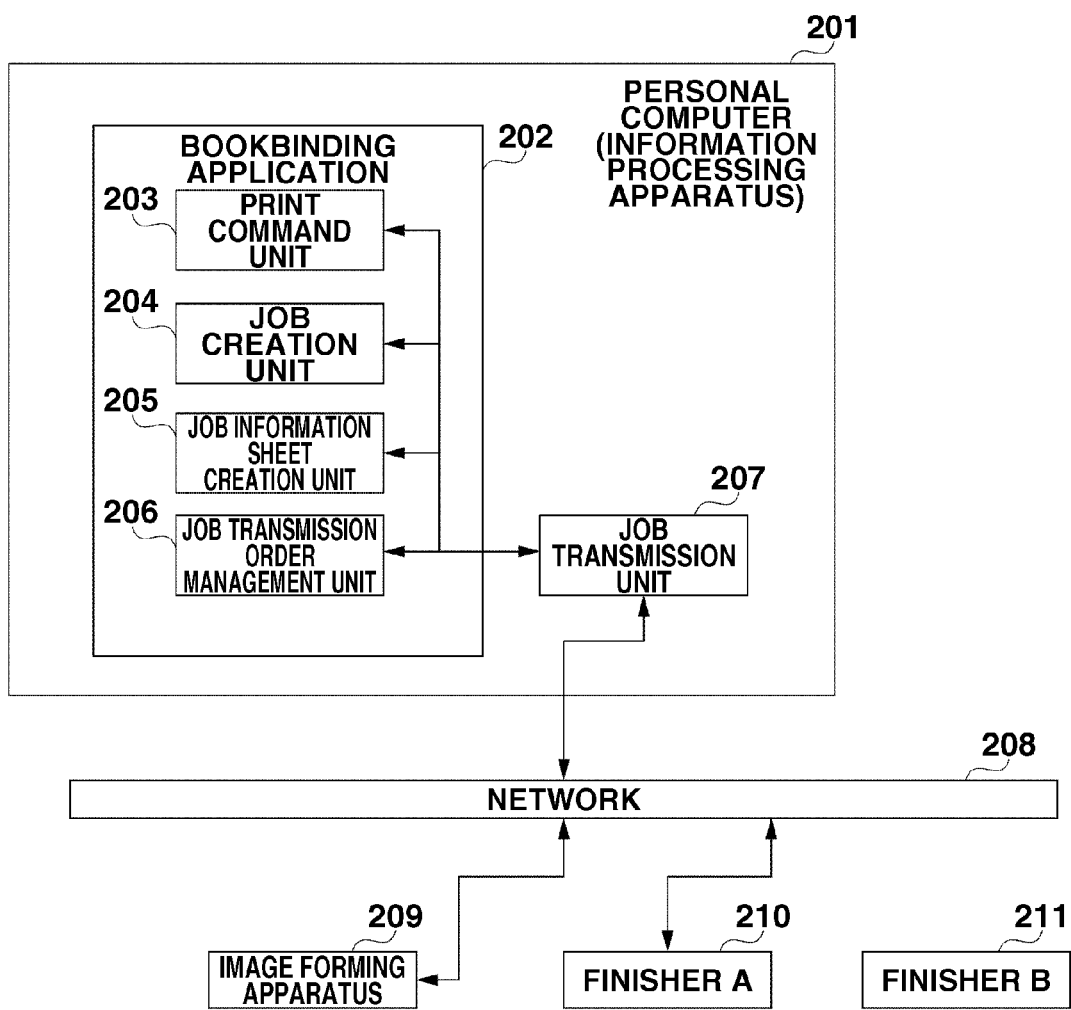
FIG. 2 is a diagram illustrating the configuration of software of the personal computer.

FIG. 2 is a schematic diagram illustrating the configuration of software of a personal computer adaptable to the present exemplary embodiment for each functional module.

The information processing apparatus 201 described with reference to FIG. 1 creates a print job according to a print command of a user before sending the print job to the printer 209.

In the present exemplary embodiment, the bookbinding application 202 is used to do printing.

The bookbinding application 202 has modules 203 to 206.

The print command unit 203 issues print instructions according to a print command when the print command is input by a user using a user interface exemplified in FIG. 5. In the print command unit 203, print attributes such as the output destination printer, printing method, the number of print copies, and a range of pages are set.

The job creation unit 204 creates a print job (first print job) according to print instructions from the print command unit 203. The first print job includes at least text ordered from a customer.

The job information sheet creation unit 205 generates a print job (second print job) of a job information sheet when print instructions that need a job information sheet are received. Print instructions that need a job information sheet are, for example, those that perform near-line finishing (print post-processing).

The job transmission order management unit 206 manages print jobs created by the job creation unit 204 and the job information sheet creation unit 205. If a second print job of a job information sheet is created by the job information sheet creation unit 205, two print jobs are output from the bookbinding application 202.

The job transmission order management unit 206 sends the plurality of jobs to a job transmission unit 207.

A job transmission unit 207 in a personal computer is an interface between a personal computer and an image forming apparatus and corresponds to a general printer driver or printer spooler.

A print job output from the bookbinding application 202 is sent to the image forming apparatus via the job transmission unit 207. The job transmission unit 207 sends a print job after converting the print job into print data that can be interpreted by the image forming apparatus. A network 208 which is the general Internet or a general intranet. The information processing apparatus 201, and the image forming apparatus 209 and a near-line finisher 210 can perform bi-directional communication. The job transmission unit 207 may send a first print job and a second print job as separate print data to the image forming apparatus or as one piece of print data to the image forming apparatus.

The image forming apparatus 209 prints print data sent from the information processing apparatus 201. Details thereof will be described with reference to FIG. 3. Finishing work can be done on a printed product printed by the image forming apparatus 209. The finishing work is processing applied to a product printed by the image forming apparatus 209 such as sheet cutting and bookbinding. A near-line finisher 210 can send and receive information via the network 208.

Reference numeral 211 is offline finisher. Like the near-line finisher 210, an offline finisher 211 can perform finishing work on the product printed by the image forming apparatus 209. A difference of the offline finisher 211 from the near-line finisher 210 is whether the network 208 can be used. The offline finisher 211 cannot use the network 208.

Figure 3:
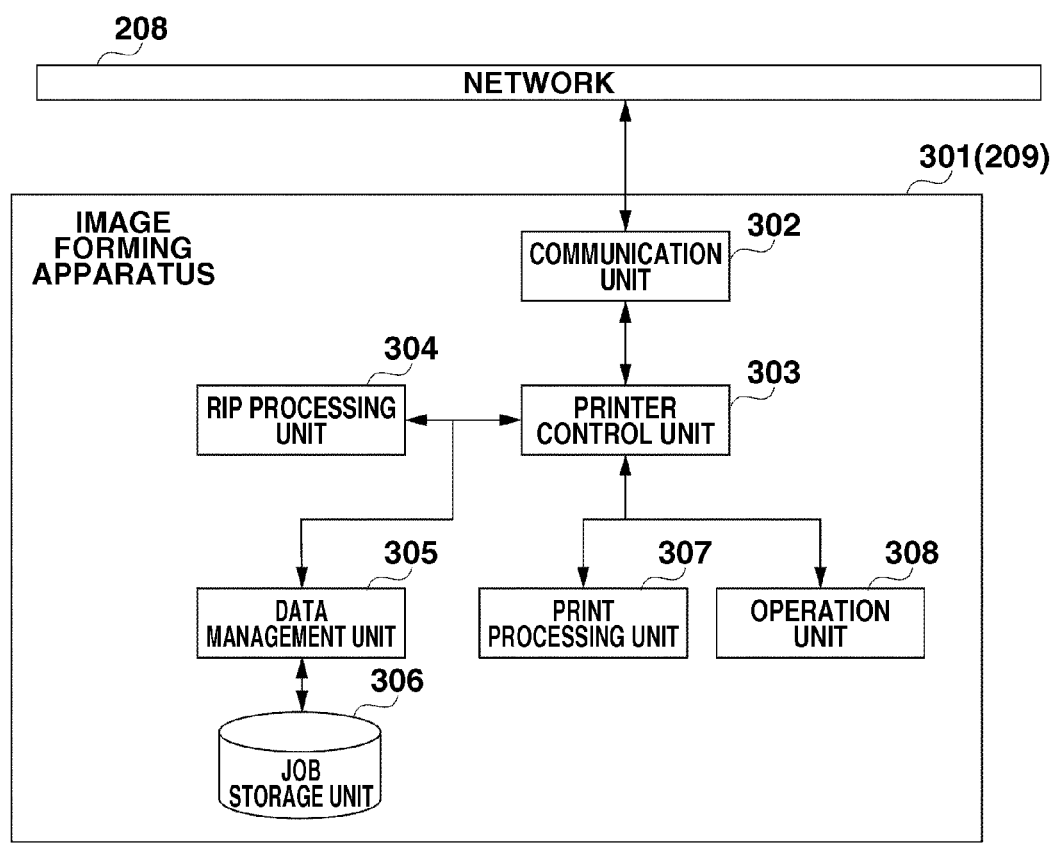
FIG. 3 illustrates a schematic diagram of an image forming apparatus.

FIG. 3 is a schematic diagram of an image forming apparatus adaptable to the present exemplary embodiment.

An image forming apparatus 301 is similar to the image forming apparatus 209 in FIG. 2.

A communication unit 302 receives print data from the information processing apparatus 201 via the network.

A printer control unit 303 controls the operation of a whole printer by issuing commands of processing to each module of the image forming apparatus 301.

A RIP processing unit 304 decodes print data for RIP (Raster Image Processor) expansion.

A data management unit 305 stores data on which RIP processing has been performed, in a job storage unit 306 described below, to manage the search, fetching, and replacement of the stored data.

The job storage unit 306 stores data on which RIP processing has been performed and a print job to print a job information sheet.

A print processing unit 307 performs print processing sequentially on a printing sheet by performing image processing on data on which RIP processing has been performed.

An operation unit 308 receives a user's print command from an operation unit of the image forming apparatus 301 and provides instructions to the printer control unit.

Figure 4:
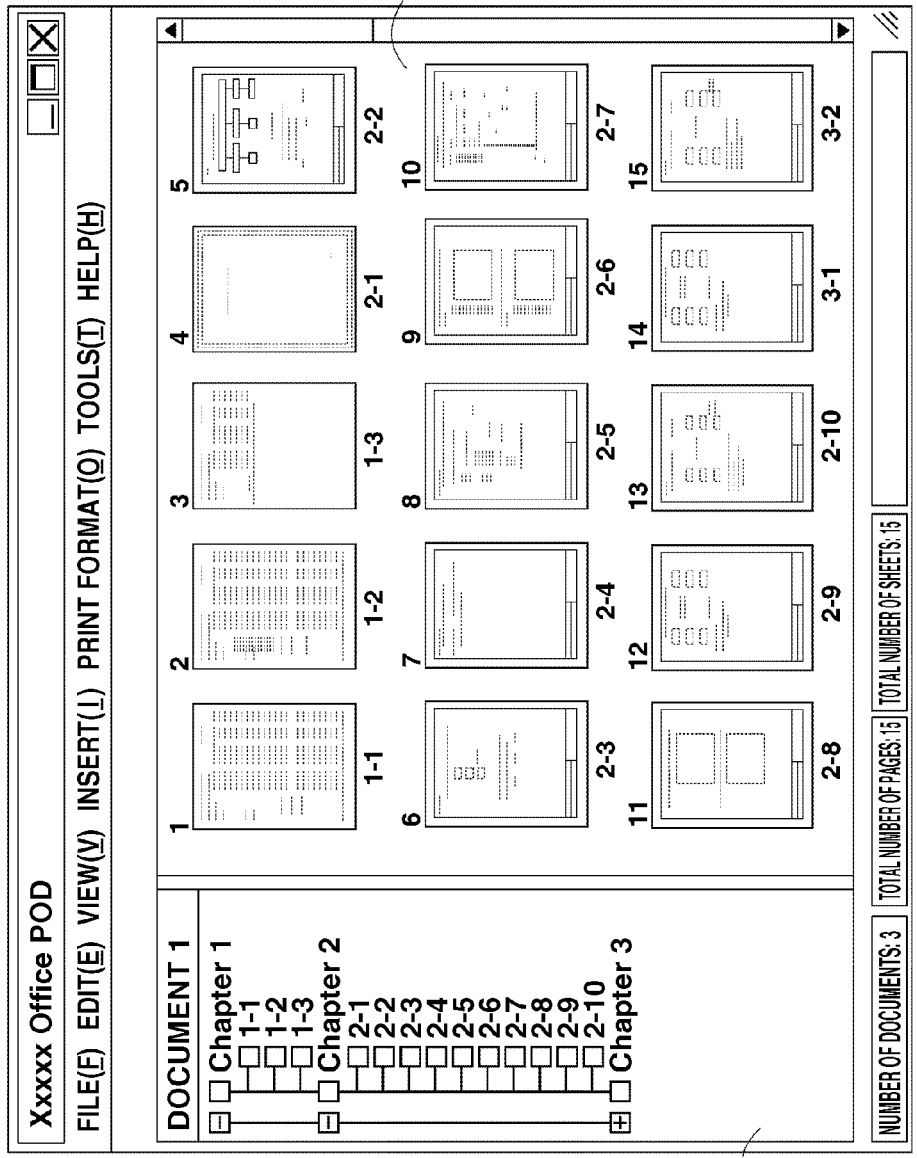
FIG. 4 illustrates an operation user interface (UI) of a bookbinding application.

FIG. 4 is a UI screen provided by the bookbinding application 202 and adaptable to the present exemplary embodiment.

A UI screen 401 includes a tree portion 402 showing a structure of data and a preview portion 403 to display printed states. The preview portion 403 displays a preview image based on data received from the application.

In the tree portion 402, pages contained in each chapter are displayed as a tree structure. Pages displayed in the tree portion 402 are draft pages. In the preview portion 403, content of print pages is displayed by scaling down the print pages. The display order thereof reflects the structure of the tree portion 402.

FIG. 5 illustrates a print command UI 501 of the bookbinding application.

The user can specify execution of the near-line finisher by using the print command UI 501.

The user can optionally edit a job name 502 and an item 503 into which the user name is input. An item 504 selects the printer to be used for printing. The job ID 505 is automatically generated by the bookbinding application 202 and is used by the job transmission order management unit 206 to manage jobs. Any value specifiable by the user may be used as long as the value is distinguishable from other job IDs. An item 506 specifies the near-line finisher that performs post-processing. A button 507 gives instructions to start printing.

Figure 6A:
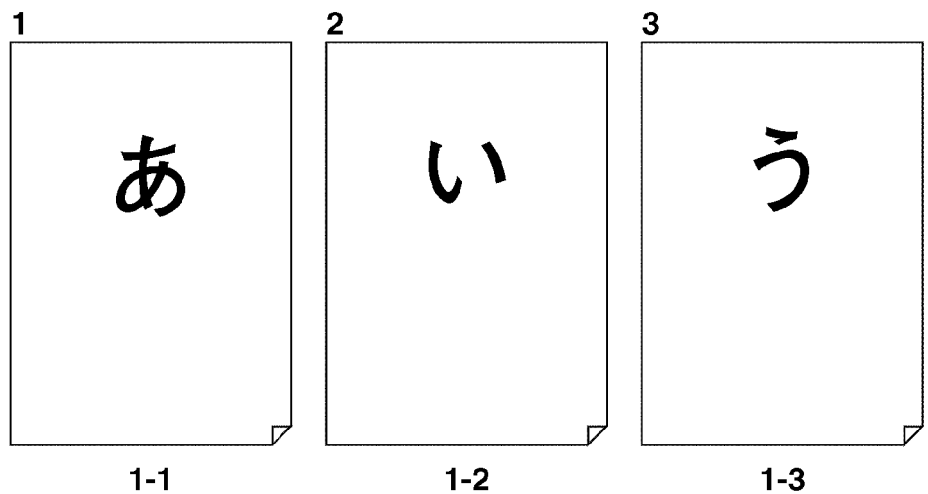
FIGS. 6A and 6B illustrate a print job of the bookbinding application.
Figure 6B:
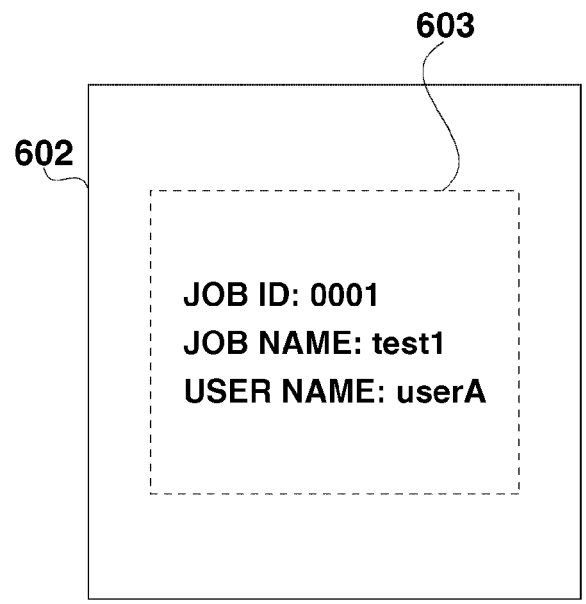

FIG. 6 illustrates a first print job 601 that prints three pages generated by the bookbinding application and a second print job 602 that prints a job information sheet.

The first print job 601 is printed by the image forming apparatus 209. A preview image of each page contained in the first print job 601 is displayed in a UI display unit of the bookbinding application 202. The first print job 601 specifies that the near-line finisher 210 performs finishing processing. Actually, while a simple printed product such as the first print job 601 is rarely handled by the near-line finisher, the present invention will be described by using a simple printed product.

The second print job 602 is printed by the image forming apparatus 209. The second print job 602 is generated by the bookbinding application 202.

The second print job 602 contains related information 603 showing its relationship to the first print job 601. The related information 603 is set by the print command UI 501. The related information 603 in FIG. 6B includes three pieces of information: the job ID, job name, and user name. Related information of a second print job only needs to specify post-processing such as a bar code in which the finishing order, work schedule, and related information are embedded. The user inputs at least one piece of the related information printed on a job information sheet into the near-line finisher. As a result, the near-line finisher performs finishing processing determined based on the input related information. The near-line finisher receives data in which the related information and finishing processing information are integrated, from the information processing apparatus 201 before the related information is input by the user.

Next, creation processing of a print job (second print job) of a job information sheet of the bookbinding application 202 and transmission processing thereof will be described.

FIG. 7 is a flow chart to create a print job (second print job) of a job information sheet by the bookbinding application when a near-line finisher is specified by the bookbinding application. Each step of a flow chart in this application is realized by a related program read and executed by a CPU.

First, in step S701, the print command unit 203 receives a print command.

Next, in step S702, the job information sheet creation unit 205 acquires print content of a job information sheet. The print content is the related information 603 of the job information sheet 602. Information set via the job name 502, the item 503, the item 504 and the job ID 505 in FIG. 5 is stored in a memory and thus, the information is acquired from the memory.

Next, in step S703, the job information sheet creation unit 205 creates print jobs (second print jobs) of a job information sheet based on information acquired in step S702.

Next, in step S704, the job transmission order management unit 206 registers a job transmission order. Print jobs handled by the job transmission order management unit 206 will be described with reference to FIG. 8. Lastly, in step S705, the job transmission order management unit 206 sends the print jobs to the job transmission unit 207.

Figure 8:
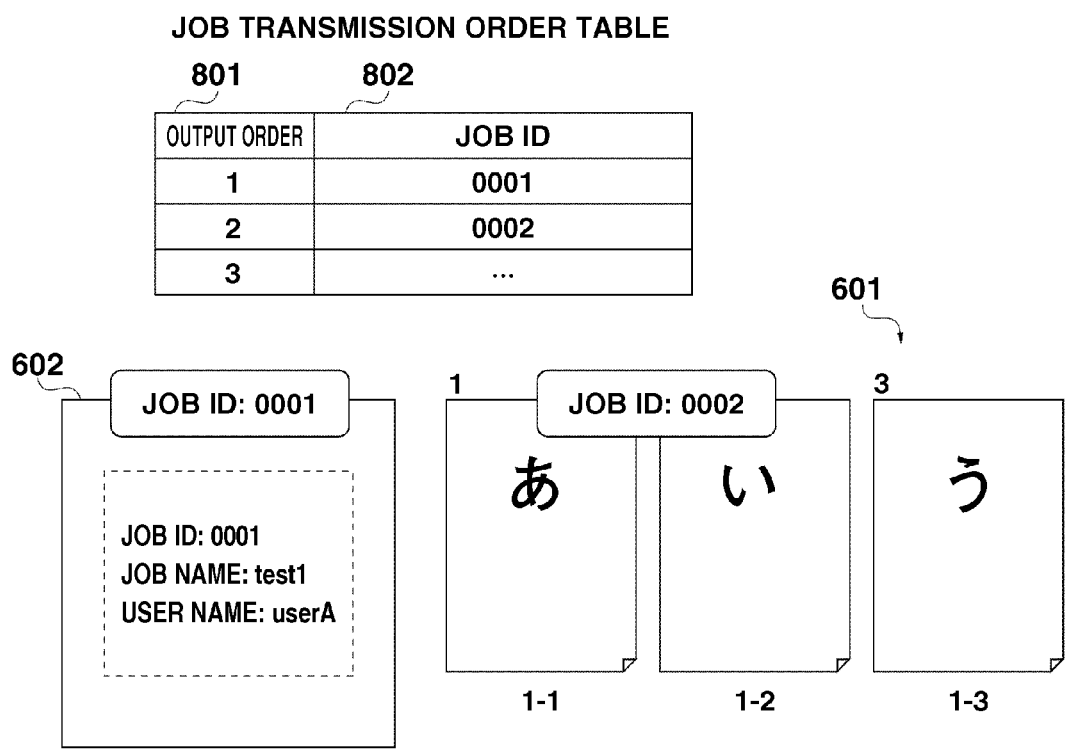
FIG. 8 illustrates a job transmission order table.

FIG. 8 is a job transmission order table.

The job transmission order table is used by the job transmission order management unit 206. In the job transmission order table, an output order 801 and a job ID 802 are associated with each other. In FIG. 8, the job ID: 0001 is the first of the output order and the job ID: 0002 the second one of the output order.

If associated with jobs in FIG. 6, the job ID of the second print job of the job information sheet 602 is "0001" and the job ID of the first print job of the printed product 601 is "0002".

The job transmission order management unit 206 sends print jobs to the job transmission unit 207 in the order of the output order 801 in step S705 and the image forming apparatus 209 receives the second print job 602 and the first print job 601 in this order. Here, if the image forming apparatus 209 outputs a printed product in a face-down manner, the job information sheet is first printed and then, the first print job is processed. Thus, the job information sheet is output at the head of a printed product, making verification of the job information sheet by the user easier. On the other hand, if the image forming apparatus 209 outputs a printed product in a face-up manner, the first print job may be output first.

Thus, a job information sheet is created based on a print command of the bookbinding application 202 as described above.

Next, the tasks of the present invention will be described.

Figure 9:
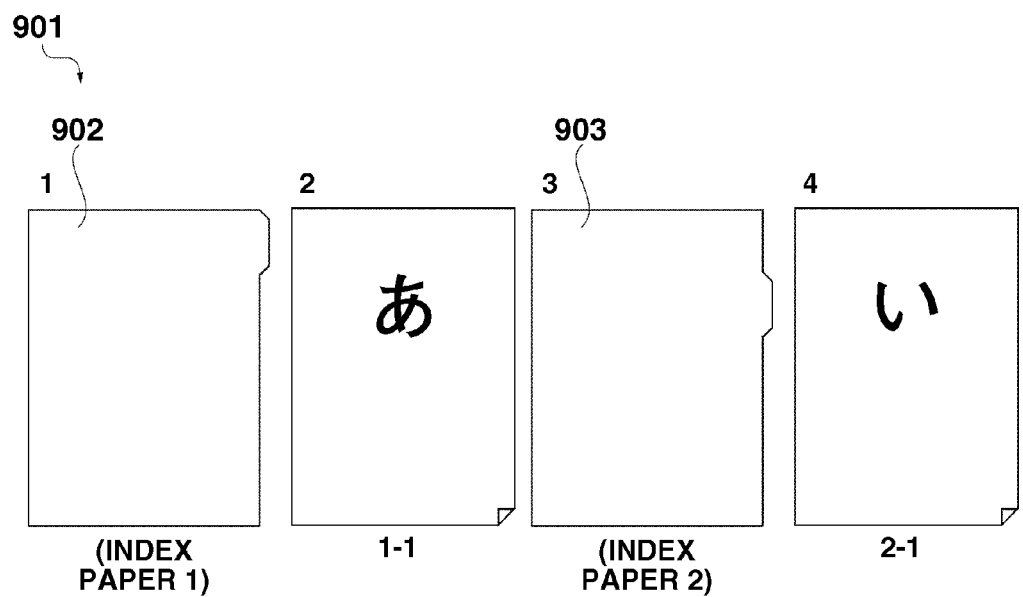
FIG. 9 illustrates a first print job which is a task of a first exemplary embodiment.

In FIG. 9, a first print job 901 specifies execution of near-line finishing after printing. Moreover, as is evident from FIG. 9, the first print job 901 specifies insertion of tab paper 902 and 903 in the first and third pages therein. FIG. 9 also illustrates a printing result desired by the customer.

Figure 10:
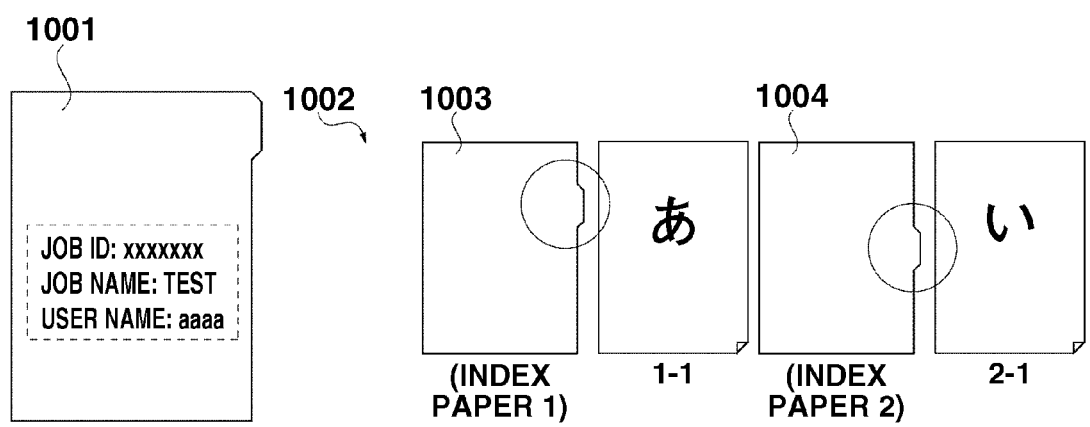
FIG. 10 illustrates the job information sheet which is a task of the first exemplary embodiment.

FIG. 10 is an example of the job information sheet, which is a task of the present exemplary embodiment.

FIG. 10 illustrates a result of printing both the first print job 901 and the second print job of the job information sheet.

A job information sheet 1001 and a printed product 1002 of the first print job 901 are printed by an image forming apparatus.

The job information sheet 1001 is printed on tab paper. The printing is carried out by reference to print settings of a first print job generated by the job creation unit 204 when a second print job of a job information sheet is created.

The job information sheet is not ordered by the customer. Thus, print settings for the job information sheet are not specified in the order. Therefore, the bookbinding application 202 realizes reliable printing by applying print settings specified according to the customer's order and used by the job creation unit 204, to the second print job of the job information sheet.

More specifically, the paper specified according to the customer's order is set to the image forming apparatus and by using the same type of paper as the specified one, the job information sheet is also printed reliably.

Here, if the bookbinding application specifies that the job information sheet be printed on paper fed by the same paper feed unit as that of the first sheet of the first print job, the tab paper used for the tab paper 902 in FIG. 9 will be used as the printing paper of the job information sheet 1001. The tab papers are normally set to the image forming apparatus as a set composed of a plurality of sheets having different tab positions, for example, like the job information sheet 1001, the first page 1003, and the second page 1004.

Thus, the first sheet of tab paper in the set is used as printing paper of the second print job of the job information sheet and therefore, the second sheet of tab paper in the same set is used for the first sheet of the first print job to be printed after the second print job of the job information sheet.

As a result, though the customer originally ordered a printing result as illustrated in FIG. 9, a printing result as illustrated in FIG. 10 is obtained, so that printing desired by the customer cannot be realized.

Figure 11A:
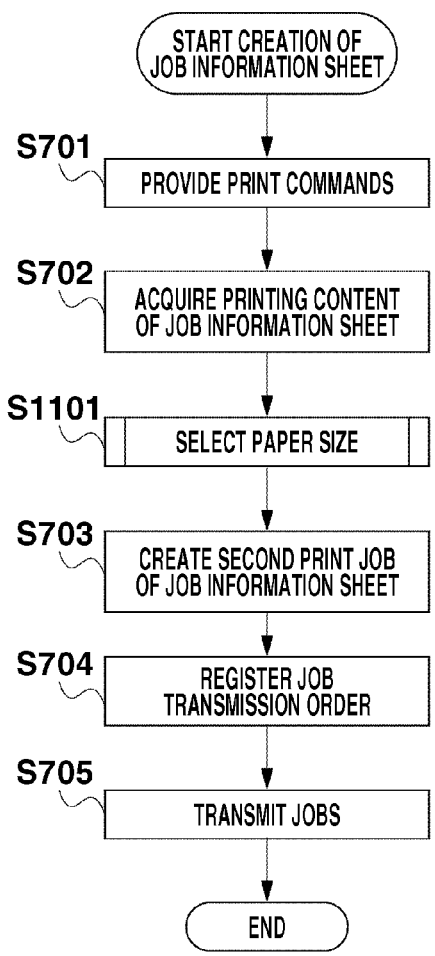
FIGS. 11A and 11B are flow charts for creating the job information sheet adaptable to the first exemplary embodiment.

In FIG. 11A, a sub-flow for paper size selection in step S1101 is added to the flow chart to create a job information sheet in FIG. 7.

Similar to FIG. 7, in the flow chart in FIG. 11A, a job information sheet is printed when a command of near-line finishing is issued by the bookbinding application 202.

Steps S701 to S705 in FIG. 11A are similar to those in FIG. 7 and thus, description thereof will not be repeated.

This flowchart is characterized in that in step S702, after print content of the job information sheet is acquired by the job information sheet creation unit 205, selection processing of the paper size is performed in step S1101.

Figure 11B:
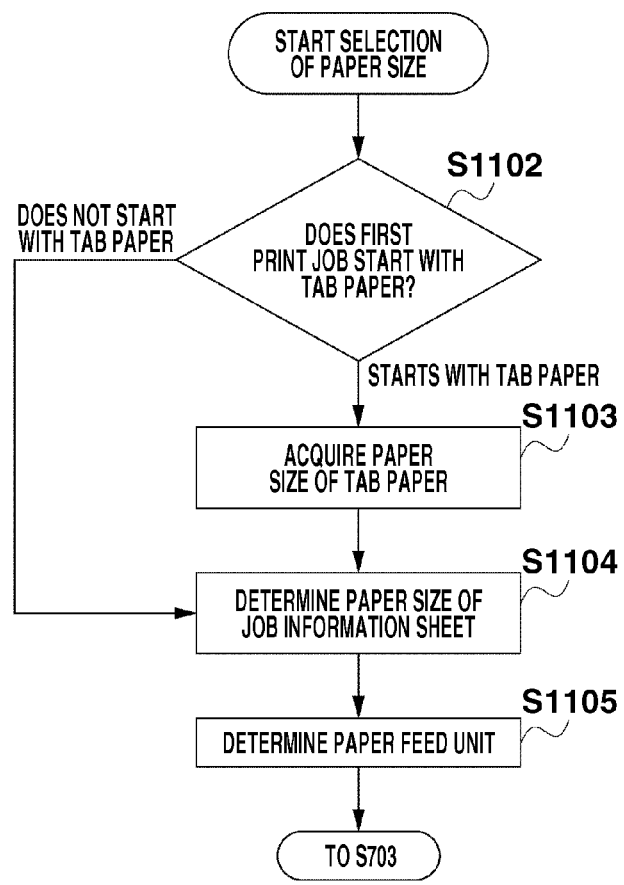

FIG. 11B is a detailed flow chart of step S1101.

In step S1102, the job information sheet creation unit 205 analyzes a first print job generated by the job information creation unit to determine whether the tab paper is set to be used for the first page of the first print job.

In step S1103, if the use of tab paper is determined in step S1102, the job information sheet creation unit 205 acquires the paper size of tab paper. Regular sizes are provided for tab paper, for example, tab paper for A4 size and for A5 size exist. Thus, if, for example, tab paper for A4 is set as the first page 902, the job information sheet creation unit 205 acquires the A4 size. If tab paper for A4 is set as the first page 902, it is highly probable that the second page is printed in the A4 size.

In step S1104, the job information sheet creation unit 205 determines the paper size used for a job information sheet based on the size of tab paper. If, for example, tab paper for A4 size is set for the first page, the job information sheet creation unit 205 determines that the paper size is A4 plain paper in step S1104. The plain paper is selected by the job information sheet creation unit 205 in the determination because it is highly probable that, when compared with other types of paper (thin paper, thick paper), plain paper is set to the image forming apparatus.

In step S1105, the job information sheet creation unit 205 determines the paper feed unit capable of feeding plain paper of the paper size determined in step S1104 and generates a second print job so that the paper is fed from the paper feed unit. More specifically, processing in step S1105 is realized when the job information sheet creation unit 205 recognizes the paper set to each paper feed unit of the image forming apparatus. As a result, the job information sheet creation unit 205 can specify the paper of a type different from that of the first page of the first print job, for the job information sheet.

On the other hand, if the use of paper other than tab paper is determined in step S1102, the job information sheet creation unit 205 determines the size the first page of the first print job is the paper size of the job information sheet in step S1104 before proceeding to step S1105 described above.

Figure 12:
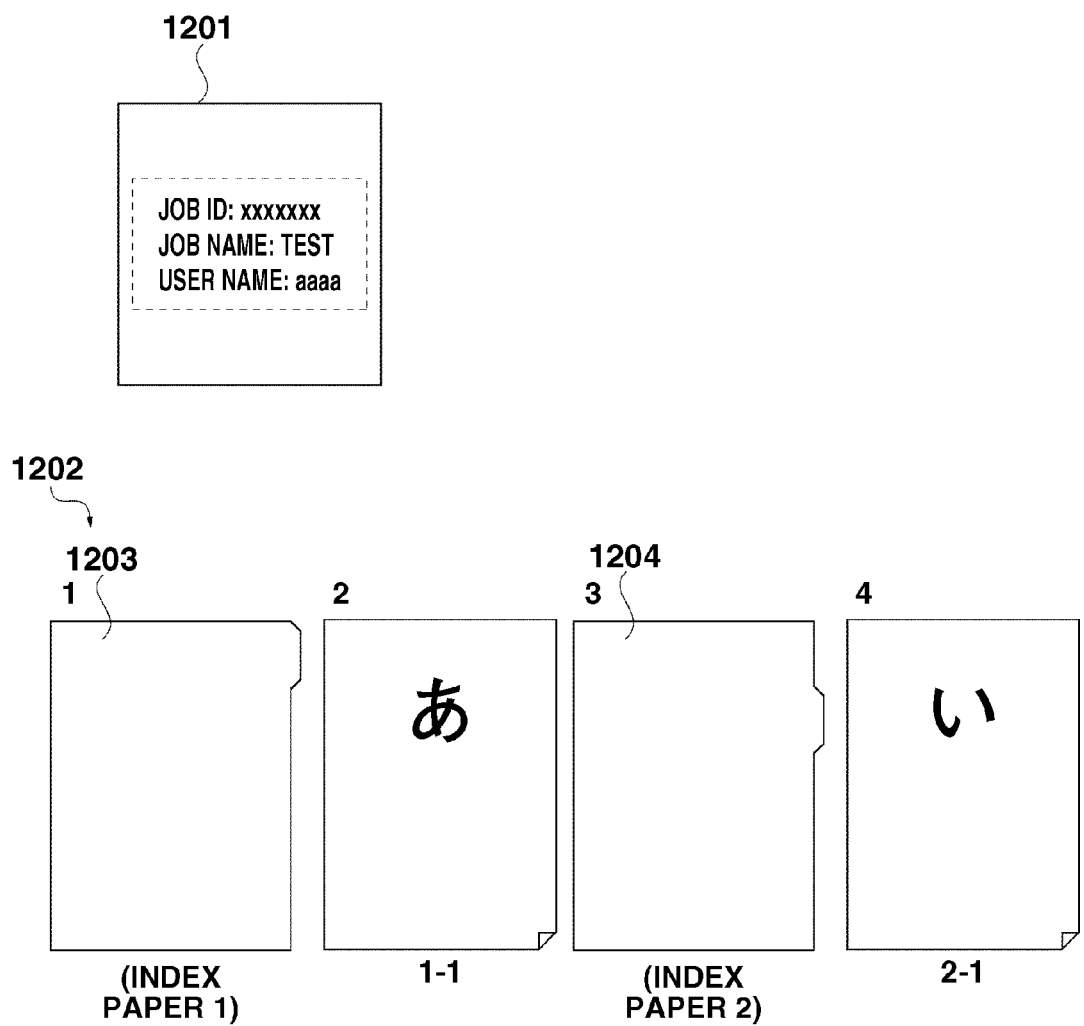
FIG. 12 illustrates the job information sheet created in the first exemplary embodiment.

FIG. 12 is an exemplar printing result output by a first print job and a second print job of a job information sheet generated through the flow chart in FIG. 11.

While the job information sheet 1001 in FIG. 10 is printed on tab paper, a job information sheet 1201 is printed on paper that is not tab paper, by executing the flow chart in FIG. 11.

In the first print job to print a printed product 1202, the tab paper is fed to the first page 1003 and the third page 1004. However, by executing the flow chart in FIG. 11, a shift of tab paper can be prevented so that it becomes possible to output the same printing result as a printed product desired by the customer as illustrated in FIG. 9 and also print a job information sheet.

Thus, even if the tab paper is included in the first print job to print a result ordered by the customer, a printed product desired by the customer can be output and also a job information sheet is printed, so that convenience of near-line finishing can be improved.

The present exemplary embodiment, as described above, takes an example in which the tab paper is fed for the first sheet of the first print job. However, the present exemplary embodiment is not limited to the tab paper and is also valid for a set of papers including a plurality of sheets to be used in turn (for example, a set of interleaves composed of papers of different colors).

In the first exemplary embodiment, as an example, only the related information 603 is printed on a job information sheet. For the purpose of making a relationship to a printed product of the first print job clear, a method of printing an image of the first print job also exists. A second exemplary embodiment deals with a task when an image of the first print job is printed on the job information sheet.

The second exemplary embodiment is similar to the first exemplary embodiment regarding FIGS. 1 to 6 and FIG. 8 and description thereof will not be repeated.

To make a relationship between a printed product of the first print job 601 and the job information sheet 602 output by the second print job easier to understand, a portion of the first print job may be printed on the job information sheet.

Figure 13:
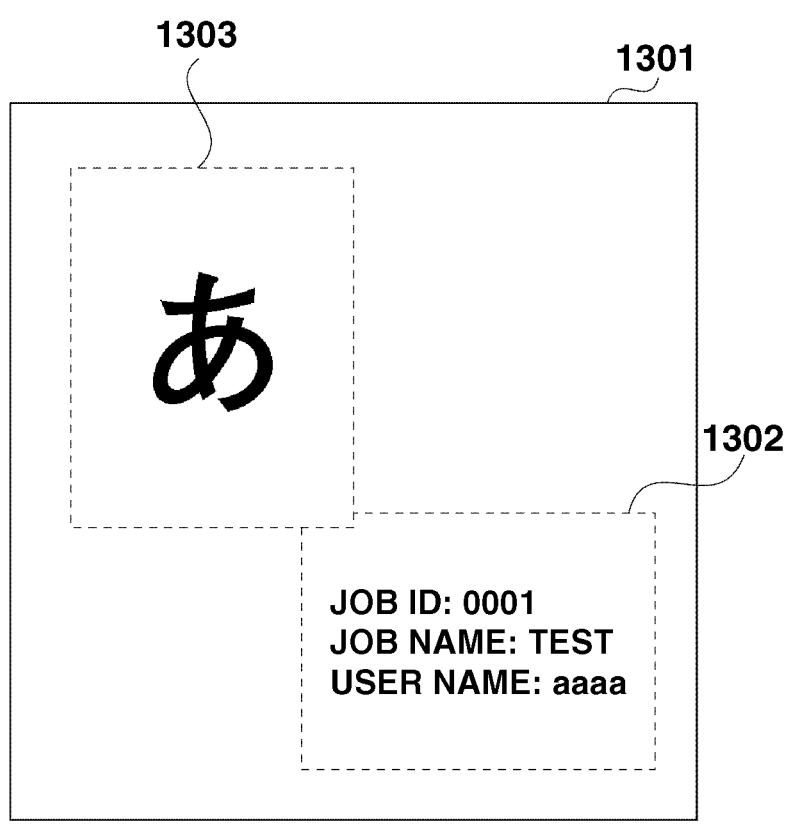
FIG. 13 illustrates the job information sheet in a second exemplary embodiment.

FIG. 13 is an example of the job information sheet in the second exemplary embodiment.

A job information sheet 1301 includes a thumbnail 1303 indicating a portion of the first print job. The job information sheet 1301 is created for the first print job 601 in FIG. 6. The job information sheet 1301 includes related information 1302 and the thumbnail 1303.

With the thumbnail 1303 in the first page of the first print job contained in the job information sheet, the possibility that the user misunderstands a printed product (printed product of the first print job 601 in FIG. 6) related to a job information sheet when the user views the job information sheet 1301 can be reduced.

Next, the task of the second exemplary embodiment will be described.

Figure 14:
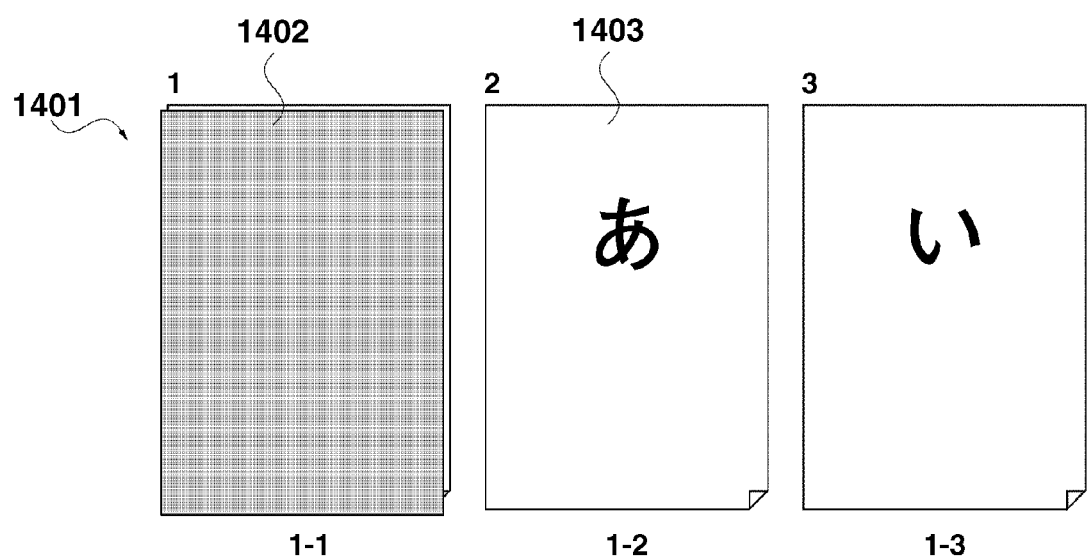
FIG. 14 illustrates the first print job which is a task of the second exemplary embodiment.

In FIG. 14, a first print job 1401 specifies that an interleaf 1402 be put to the first page and the first page of the first print job 601 in FIG. 6 becomes a second page 1403. The first print job 1401 in FIG. 14 also represents a printed product.

Figure 15:
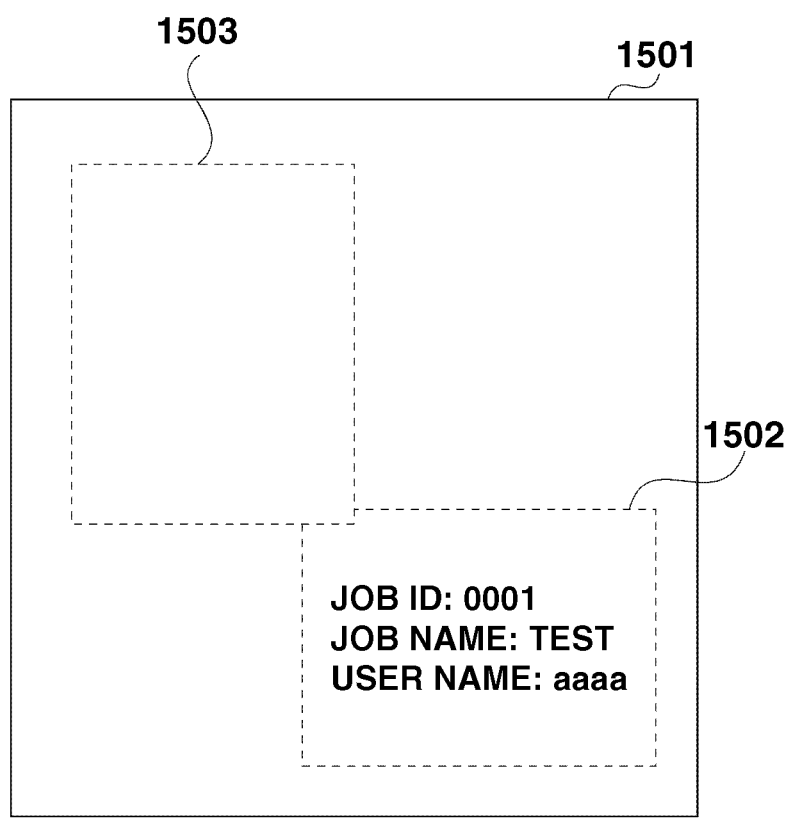
FIG. 15 illustrates the job information sheet which is a task of the second exemplary embodiment.

FIG. 15 is an example of the job information sheet which is a task of the present exemplary embodiment.

FIG. 15 is a job information sheet printed by a second print job generated from the first print job 1401 in FIG. 14. Like the job information sheet 1301, a job information sheet 1501 includes related information 1502 and a thumbnail 1503. A portion of print data of the first print job is embedded as the thumbnail 1503 and the first page 1402 of the first print job is an interleaf that contains no image. Thus, the first page has no data to be printed. Therefore, the thumbnail 1503 becomes blank.

Accordingly, it is difficult to reduce the possibility that the user misunderstands a printed product of the first print job related to a job information sheet when the user views the job information sheet as described with reference to FIG. 13.

FIG. 16A is a flow chart after a sub-flow of thumbnail selection of step S1601 is added to the flow chart in FIG. 7.

Like in FIG. 7, the flow chart in FIG. 16 is executed when a command of near-line finishing printing is issued by the bookbinding application 202.

Steps S701 to S705 in FIG. 16A are similar to those in FIG. 7 and thus, description thereof will not be repeated.

In step S702, after print content of the job information sheet is acquired by the job information sheet creation unit 205, in step S1601, selection processing of the thumbnail is performed.

FIG. 16B is a detailed flow chart of step S1601.

In step S1602, the job information sheet creation unit 205 acquires information about the first print job. The information acquired here contains print settings and print data of the first print job. Print settings and print data can freely be referenced and changed by the bookbinding application 202 after they are expanded into the RAM 102.

Steps S1603 and S1606 are repetitive operations to be paired. The repetitive operations are performed according to the number of pages with a page number N set as an increment argument. The initial value of the page number N is 1. That is, the first loop is intended for the first page of the first print job (for example, an interleaf 1402 in FIG. 14).

Next, in step S1604, the job information sheet creation unit 205 determines whether the page number N exceeds the final page number. This is end determination of the program. If N exceeds the maximum number of pages of the first print job, there is no need to continue processing and the processing proceeds to step S1607.

On the other hand, if N does not exceed the final page number, the processing proceeds to step S1605.

In step S1605, the job information sheet creation unit 205 determines whether there is print data for the page indicated by N. More specifically, processing in step S1605 is realized by the job information sheet creation unit 205 determining whether there is an image object or a character object regarding the page N of the first print job. If a determination is made that there is no print data, a thumbnail cannot be created and thus, the processing of the job information sheet creation unit 205 proceeds to step S1606 to increment the value of the page number N by 1 before returning to step S1603. In other words, the next page is searched.

If there is print data for the page indicated by N in step S1605, processing of the job information sheet creation unit proceeds to step S1607.

In step S1607, the job information sheet creation unit 205 determines that the page judged to have print data in step S1605 is print data used as a thumbnail.

If processing in step S1607 is performed after the final page number exceeds by the page number N, there is no print data in all pages. Thus, the job information sheet creation unit 205 determines to create a second print job without a thumbnail. Alternately, the job information sheet creation unit 205 determines to create a blank thumbnail. Processing of the job information sheet creation unit proceeds from steps S1607 to S703 to generate a second print job of the job information sheet.

Figure 17:
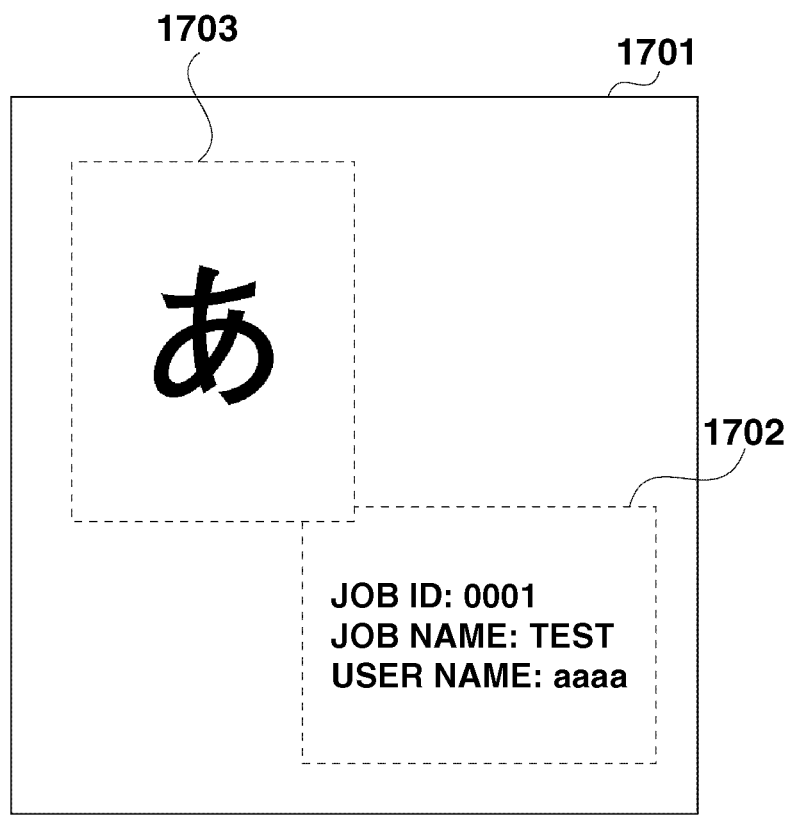
FIG. 17 illustrates the job information sheet created in the second exemplary embodiment.

FIG. 17 is an example of a job information sheet 1701 created in the present exemplary embodiment.

The flow chart in FIG. 16 is executed to the first print job to print the printed product 1401 in FIG. 14. FIG. 17 is the job information sheet 1701 printed as a result of the execution of the flow chart. While the thumbnail 1503 of the job information sheet 1501 in FIG. 15 is blank, the second page 1403 of the first print job is used as a thumbnail 1703 in the job information sheet 1701. Since the first page 1402 in FIG. 14 has no print data, the job information sheet 1701 in FIG. 17 is generated after determination is made to use the second page 1403 as a thumbnail in step S1605 in FIG. 16.

In the present exemplary embodiment, as an example, an interleaf is fed to the first page of print data, but the present exemplary embodiment is not limited to only interleaf and is also valid when there is no data to be printed in the first page of the print data (for example, tab paper or blank paper insertion).

According to the second exemplary embodiment, if a portion of the first print job should be printed on the job information sheet as a thumbnail and no print data is found in the first page of the first print job, a thumbnail can be printed by following pages.

Thus, a thumbnail of the first print job can be printed on the job information sheet regardless of content of the first page of print data, so that convenience of near-line finishing can be improved.

A third exemplary embodiment is directed to preventing degradation in performance due to printing of a job information sheet.

The present exemplary embodiment is similar to the first exemplary embodiment regarding FIGS. 1 to 6 and FIG. 8 and description thereof will not be repeated.

When a plurality of pages is printed consecutively by an image forming apparatus, there is a possibility that the time until printing is completed will be longer if the grammage of paper used by the plurality of pages is different (hereinafter, the expression of degradation in performance will be used to represent the phenomenon). This is because the image forming apparatus controls the temperature to fix the print. In other words, the proper temperature changes depending on paper on which printing is done so that temperature control becomes necessary when paper having different grammage is printed. Thus, if papers of the same grammage are consecutively used, printing performance is improved. This is not limited to processing performed within one job and the performance is also influenced when the grammage changes in the next job. The grammage is the weight per unit area. Hereinafter, the setting of grammage will be treated in the same way as the paper type.

Figure 18:
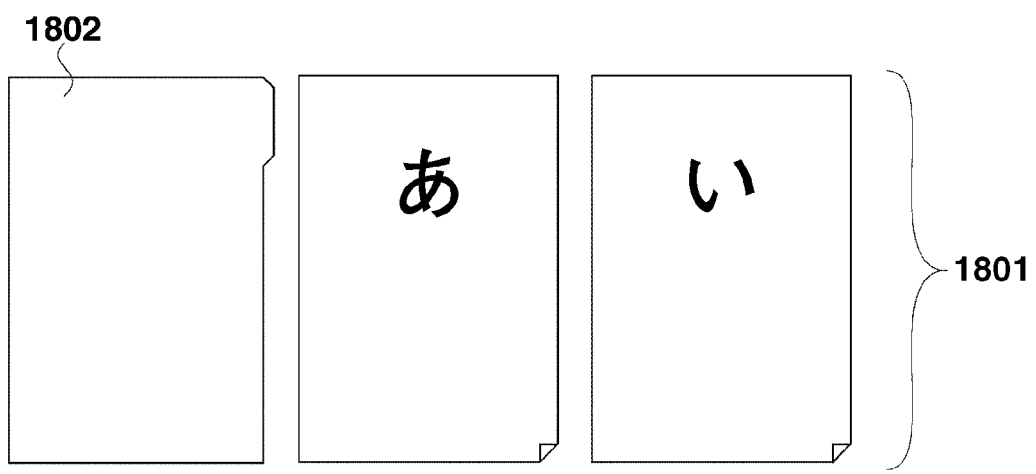
FIG. 18 illustrates the first print job which is a task of a third exemplary embodiment.

FIG. 18 is an example of the first print job to be a task of the present exemplary embodiment.

A first print job 1801 specifies execution of near-line finishing. In FIG. 18, thick A4 tab paper is specified for a first page 1801 and the thick papers will be used for the second and subsequent pages. FIG. 18 also represents a printed product of the first print job.

If the first page of the first print job uses tab paper, plain paper having the size of tab paper of the first page is selected for the job information sheet as has been described in the first exemplary embodiment.

Figure 19:
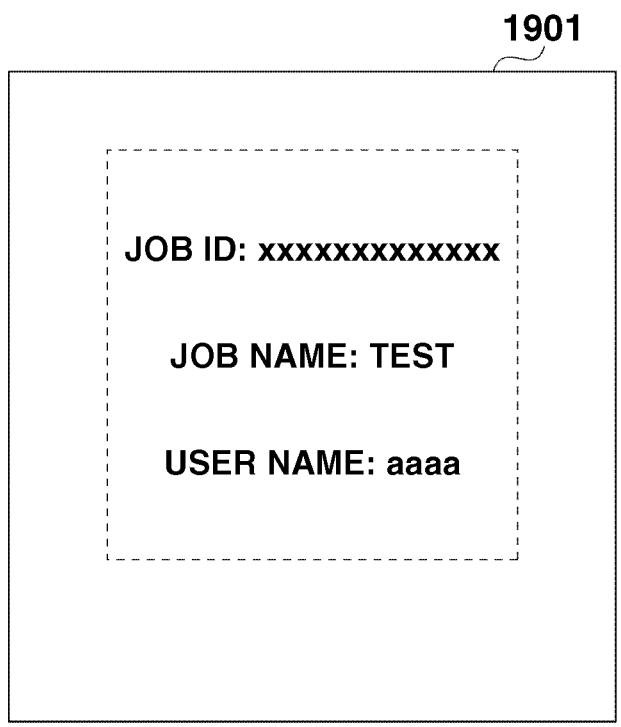
FIG. 19 illustrates the job information sheet which is a task of the third exemplary embodiment.

Thus, as illustrated in FIG. 19, the job information sheet for the first print job in FIG. 18 will be printed on plain paper.

However, if, as illustrated in FIG. 19, plain paper is used, it becomes necessary for the image forming apparatus 209 to adjust the temperature again for the thick paper after the temperature is adjusted for the plain paper to print a job information sheet 1901 and print the first print job 1801.

As a result, there is a possibility of degradation in printing performance.

FIG. 20 is a flowchart for creating a job information sheet that changes the paper type adaptable to the present exemplary embodiment.

In FIG. 20A, a sub-flow of paper size selection in step S2001 is added to the flow chart for creating a job information sheet in FIG. 7. Like in FIG. 7, this is a flow chart for creating a job information sheet when a near-line finishing print command is issued by the bookbinding application 202.

Steps S701 to S705 in FIG. 20A are similar to those in FIG. 7 and thus, description thereof will not be repeated.

This flowchart is characterized in that in step S702, after print content of the job information sheet is acquired by the job information sheet creation unit 205, selection processing of the paper size is performed in step S2001.

FIG. 20B is a detailed flow chart of step S2001.

The job information sheet creation unit 205 determines whether the first page of the first print job uses plain paper in step S2002. The first print job is, for example, a first print job 1801 in FIG. 18.

If the job information sheet creation unit 205 determines that the first page of the first print job is not plain paper, processing proceeds to step S2003.

In step S2003, the job information sheet creation unit 205 acquires the paper type of the first page of the first print job and determines that the paper type thereof is the paper type of the job information sheet (step S2004).

Figure 21:
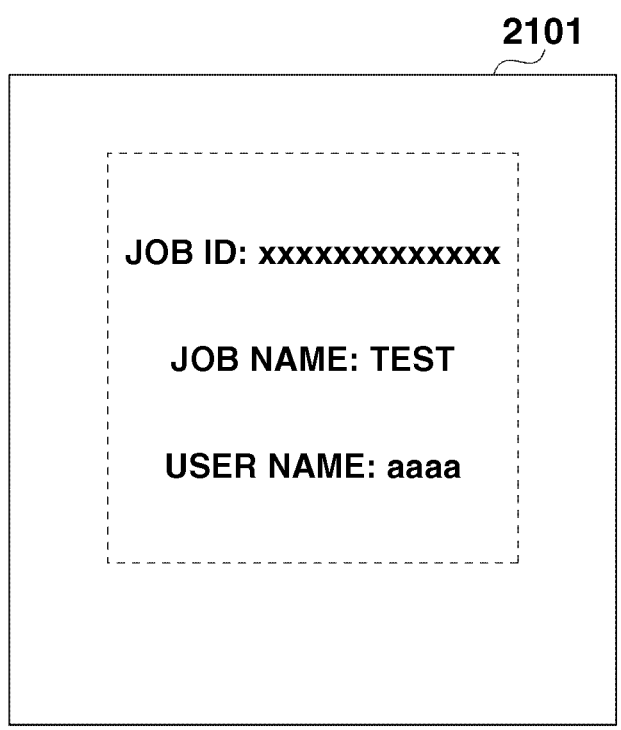
FIG. 21 illustrates the job information sheet created in the third exemplary embodiment.

FIG. 21 is an example of a job information sheet 2101 created in the present exemplary embodiment.

FIG. 21 is a job information sheet created for the first print job 1801 in FIG. 18 by using the processing flow in FIG. 20. While the job information sheet in FIG. 19 is printed on plain paper, the job information sheet 2101 is printed on thick paper. As a result, degradation in performance described above can be prevented.

According to the third exemplary embodiment, the paper type of the job information sheet and at least that of the first page of the first print job become the same in job information sheet printing performed by a bookbinding application in the present invention. Thus, the image forming apparatus can reduce processing necessary to change the paper type, so that degradation in printing performance can be prevented.

In a fourth exemplary embodiment, an example in which the first to third exemplary embodiments are used in combination will be described.

The present exemplary embodiment is similar to the first exemplary embodiment regarding FIGS. 1 to 6, FIG. 8, FIG. 11B, FIG. 16B, and FIG. 20B and description thereof will not be repeated.

Figure 22:
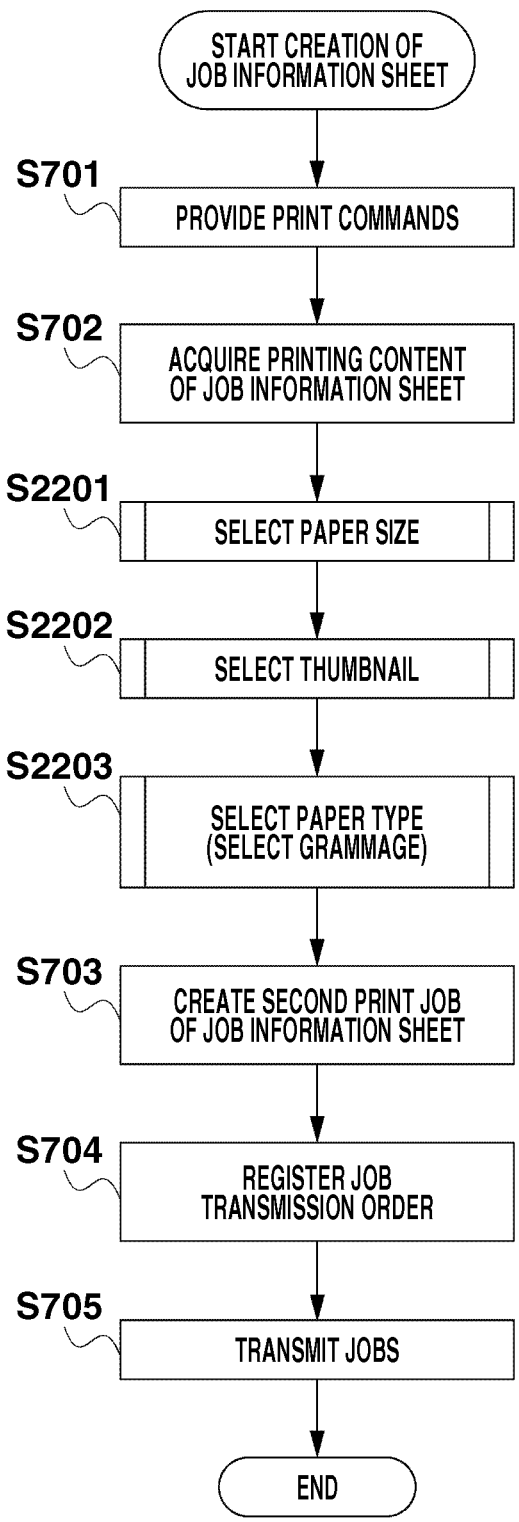
FIG. 22 is a flow chart for creating the job information sheet adaptable to a fourth exemplary embodiment.

FIG. 22 is a flow chart for creating a job information sheet that changes the paper size, a thumbnail, and paper type, adaptable to the present exemplary embodiment.

In FIG. 22, a sub-flow of paper size selection of step S2201, a sub-flow of thumbnail selection of step S2202, and a sub-flow of paper type selection of step S2203 are added to the flow chart for creating a job information sheet in FIG. 7.

Thus, the fourth exemplary embodiment is an exemplary embodiment that combines the first to third exemplary embodiments. While steps S2201, S2202, and S2203 are carried out in the order as illustrated, in the present exemplary embodiment, the processing can be performed in the order of any combination thereof or any combination of only a portion thereof.

While the paper size of the job information sheet is determined from the size of tab paper in step S1104, in the first exemplary embodiment, for example, paper of another page that does not use the tab paper may be recognized from the first print job, so that paper of the same type as the recognized paper may be determined to be the paper for a job information sheet.

The present invention is also achieved by supplying a recording medium which records program code of software realizing the above function, to an apparatus, and a computer (or a CPU or MPU) of the apparatus reads and executes the program code stored in the recording medium.

In this case, the program code itself read from the storage medium realizes the functions of the above exemplary embodiments so that the storage medium storing the program code achieves the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-126383 filed May 26, 2009, which is hereby incorporated by reference herein in its entirety.

What is claimed is:

1. An information processing apparatus, comprising:
a first generation unit that generates a first print job to print a printed product including text; and
a second generation unit that, if paper used to print a first page of the first print job is not tab paper, generates a second print job to print related information to identify post-processing performed by a post-processing apparatus on the printed product of the first print job, for the paper of a size equal to the size of the paper used to print the first page and, if the paper used to print the first page is the tab paper, generates the second print job to print the related information on the paper of a type different from the tab paper of the size determined based on the size of the tab paper used to print the first page;
wherein the second generation unit generates the second print job to print an object to be printed on the first page of the first print job together with the related information; and
the second generation unit determines whether the first page of the first print job contains an object to be printed, and generates, if it is determined that the first page of the first print job contains no object to be printed, the second print job to print an object to be printed on another page which contains any object of the first print job together with the related information.

2. The information processing apparatus according to claim 1, wherein the object is a character or an image.

3. The information processing apparatus according to claim 1, wherein the second generation unit generates, if the paper used to print the first page of the first print job is the tab paper, the second print job to print the related information on plain paper of the size determined based on the size of the tab paper.

4. The information processing apparatus according to claim 3, wherein the second generation unit generates, if the paper used to print the first page of the first print job is the tab paper of thick paper, the second print job to print the related information on the thick paper of the size determined based on the size of the tab paper.

5. An information processing apparatus, comprising:
a first generation unit that generates a first print job to print a printed product including text; and
a second generation unit that, if paper used to print a first page of the first print job is not one of a paper set composed of a plurality of different papers used in turn, generates a second print job to print related information to identify post-processing performed by a post-processing apparatus on the printed product of the first print job, for the paper of a size equal to the size of the paper used to print the first page and, if the paper used to print the first page of the first print job is one of the paper set composed of a plurality of different paper used in turn, generates the second print job to print the related information on the paper of a type different from the paper used for the first page of the size determined based on the size of the paper used to print the first page;
wherein the second generation unit generates the second print job to print an object to be printed on the first page of the first print job together with the related information; and
the second generation unit determines whether the first page of the first print job contains an object to be printed, and generates, if it is determined that the first page of the first print job contains no object to be printed, the second print job to print an object to be printed on another page which contains any object of the first print job together with the related information.

6. The information processing apparatus according to claim 5, wherein the set of papers is composed of a plurality of tab papers whose tab positions are different from each other.

7. A control method, comprising:
generating a first print job to print a printed product including text; and
if paper used to print a first page of the first print job is not tab paper, generating a second print job to print related information to identify post-processing performed by a post-processing apparatus on the printed product of the first print job, for the paper of a size equal to the size of the paper used to print the first page and, if the paper used to print the first page is the tab paper, generating the second print job to print the related information on the paper of a type different from the tab paper of the size determined based on the size of the tab paper used to print the first page generating the second print job to print an object to be printed on the first page of the first print job together with the related information; and
determining whether the first page of the first print job contains an object to be printed, and generates, if it is determined that the first page of the first print job contains no object to be printed, the second print job to print an object to be printed on another page which contains any object of the first print job together with the related information.

8. A control method, comprising:
generating a first print job to print a printed product including text; and
if paper used to print a first page of the first print job is not one of a paper set composed of a plurality of different papers used in turn, generating a second print job to print related information to identify post-processing performed by a post-processing apparatus on the printed product of the first print job, for the paper of a size equal to the size of the paper used to print the first page and, if the paper used to print the first page of the first print job is one of the paper set composed of a plurality of different papers used in turn, generating the second print job to print the related information on the paper of a type different from the paper used for the first page of the size determined based on the size of the paper used to print the first page;
generating the second print job to print an object to be printed on the first page of the first print job together with the related information; and
determining whether the first page of the first print job contains an object to be printed, and generates, if it is determined that the first page of the first print job contains no object to be printed, the second print job to print an object to be printed on another page which contains any object of the first print job together with the related information.

9. A non-transitory computer-readable storage medium storing a control program that can be read by a computer to cause the computer to execute a method comprising:
generating a first print job to print a printed product including text; and
if paper used to print a first page of the first print job is not tab paper, generating a second print job to print related information to identify post-processing performed by a post-processing apparatus on the printed product of the first print job, for the paper of a size equal to the size of the paper used to print the first page and, if the paper used to print the first page is the tab paper, generating the second print job to print the related information on the paper of a type different from the tab paper of the size determined based on the size of the tab paper used to print the first page;
generating the second print job to print an object to be printed on the first page of the first print job together with the related information; and
determining whether the first page of the first print job contains an object to be printed, and generates, if it is determined that the first page of the first print job contains no object to be printed, the second print job to print an object to be printed on another page which contains any object of the first print job together with the related information.

10. A non-transitory computer-readable storage medium storing a control program that can be read by a computer to cause the computer to execute a method comprising:

generating a first print job to print a printed product including text; and if paper used to print a first page of the first print job is not one of a paper set composed of a plurality of different papers used in turn, generating a second print job to print related information to identify post-processing performed by a post-processing apparatus on the printed product of the first print job, for the paper of a size equal to the size of the paper used to print the first page and, if the paper used to print the first page of the first print job is one of the paper set composed of a plurality of different papers used in turn, generating the second print job to print the related information on the paper of a type different from the paper used for the first page of the size determined based on the size of the paper used to print the first page;

generating the second print job to print an object to be printed on the first page of the first print job together with the related information; and determining whether the first page of the first print job contains an object to be printed, and generates, if it is determined that the first page of the first print job contains no object to be printed, the second print job to print an object to be printed on another page which contains any object of the first print job together with the related information.

\* \* \* \* \*